No. 760,224. PATENTED MAY 17, 1904.
E. W. LYONS.
BANANA HOLDER.
APPLICATION FILED NOV. 23, 1903.
NO MODEL.
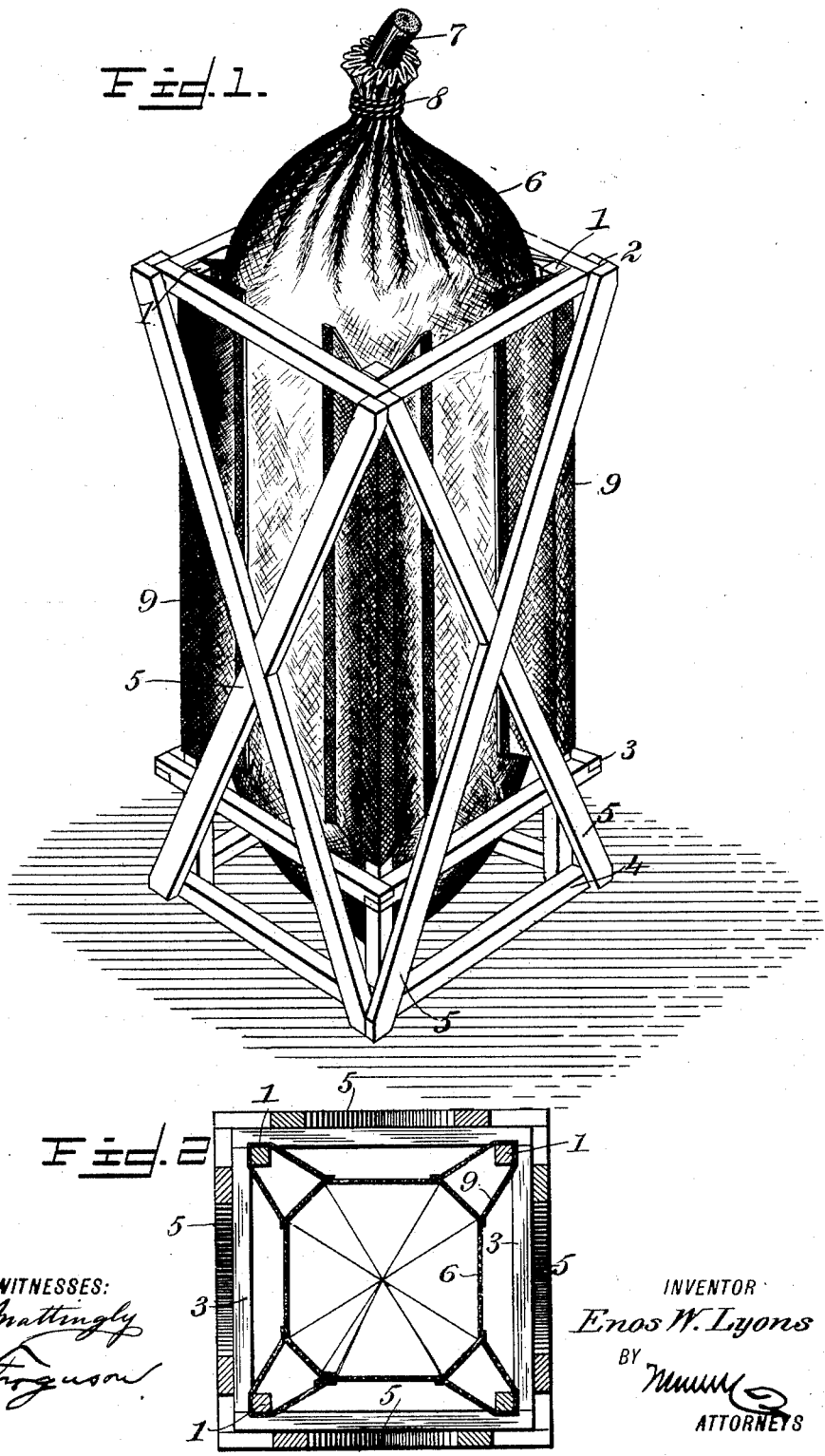
WITNESSES:
INVENTOR
Enos W. Lyons
BY
ATTORNEYS No. 760,224. Patented May 17, 1904.

UNITED STATES PATENT OFFICE.

ENOS WALTER LYONS, OF CHICAGO, ILLINOIS.

BANANA-HOLDER.

SPECIFICATION forming part of Letters Patent No. 760,224, dated May 17, 1904.

Application filed November 23, 1903. Serial No. 182,321. (No model.)

*To all whom it may concern:*

Be it known that I, ENOS WALTER LYONS, a citizen of the United States, and a resident of Chicago, in the county of Cook and State of Illinois, have invented a new and Improved Banana-Holder, of which the following is a full, clear, and exact description.

This invention relates to improvements in devices for holding bananas or similar fruit for transportation, an object being to provide a device for this purpose of simple construction, inexpensive, and in which the fruit may be readily handled without danger of breaking or other damage.

I will describe a banana-holder embodying my invention and then point out the novel features in the appended claim.

Reference is to be had to the accompanying drawings, forming a part of this specification, in which similar characters of reference indicate corresponding parts in both the figures.

Figure 1 is a perspective view of a banana-holder embodying my invention, and Fig. 2 is a horizontal section thereof.

The supporting-frame comprises corner-posts 1, attached at the upper ends to a rectangular frame 2 and at the lower end to rectangular frames 3 4, the whole structure being braced by crossed bars 5. Arranged in the frame is a bag 6, the lower end of which is conical, so as to conform substantially to the lower end of a bunch of bananas. The upper end is open, and when the bunch of bananas is inserted the stem 7 thereof is secured in the open end of the bag by means of a cord 8. The bag 6 is provided with loops 9, consisting of canvas or other suitable material stitched at the edges to the bag and engaging around the corner-posts 1. The loops 9 extend substantially the entire length of the bag-body, thus preventing collapsing between the ends, and the body is held from downward movement by securing the upper ends of the loops between the corner-posts and the upper frame.

It will be noted in Fig. 2 that there is a suitable distance between the bag and the supporting-frame. Therefore there is no danger of the fruit coming in contact with the frame.

Having thus described my invention, I claim as new and desire to secure by Letters Patent—

A holder for bananas or the like, comprising a supporting-frame having corner-posts and rectangular frame members at the upper and lower ends, crossed braces, a bag, and loops attached to said bag and engaging around the corner-posts and secured between the corner-posts and the upper rectangular frame.

In testimony whereof I have signed my name to this specification in the presence of two subscribing witnesses.

ENOS WALTER LYONS.

Witnesses:
OTTO P. KAHDAYE,
NICHOLAS J. SCHMITZ.